(12) United States Patent
Liu

(10) Patent No.: US 10,203,070 B2
(45) Date of Patent: Feb. 12, 2019

(54) LIGHT BAR AND DISPLAY DEVICE

(71) Applicants: BOE TECHNOLOGY GROUP CO., LTD., Beijing (CN); HEFEI BOE DISPLAY LIGHT CO., LTD., Hefei, Anhui Province (CN)

(72) Inventor: Gang Liu, Beijing (CN)

(73) Assignees: BOE TECHNOLOGY GROUP CO., LTD., Beijing (CN); HEFEI BOE DISPLAY LIGHT CO., LTD., Hefei, Anhui Province (CN)

( * ) Notice: Subject to any disclaimer, the term of this patent is extended or adjusted under 35 U.S.C. 154(b) by 37 days.

(21) Appl. No.: 14/608,161

(22) Filed: Jan. 28, 2015

(65) Prior Publication Data

US 2016/0195222 A1 Jul. 7, 2016

(30) Foreign Application Priority Data

Jan. 5, 2015 (CN) .......................... 2015 1 0001845

(51) Int. Cl.
| | |
|---|---|
| F21K 2/04 | (2006.01) |
| F21V 29/70 | (2015.01) |
| F21V 8/00 | (2006.01) |
| F21V 9/30 | (2018.01) |
| F21Y 115/10 | (2016.01) |

(52) U.S. Cl.
CPC ................ F21K 2/04 (2013.01); F21V 9/30 (2018.02); F21V 29/70 (2015.01); G02B 6/0023 (2013.01); G02B 6/0073 (2013.01); F21Y 2115/10 (2016.08); G02B 6/0085 (2013.01)

(58) Field of Classification Search
CPC ... F21K 2/04; F21V 29/70; F21V 9/16; F21V 9/30; F21Y 2101/02; F21Y 2103/003; F21Y 2115/10; G02B 6/0085; G02B 6/0073; G02B 6/0023

USPC ............... 362/84, 230–235, 97, 602, 608
See application file for complete search history.

(56) References Cited

U.S. PATENT DOCUMENTS

| | | | |
|---|---|---|---|
| 2008/0225508 A1 | 9/2008 | Liu et al. | |
| 2010/0123855 A1* | 5/2010 | Shin ................. | G02F 1/133617 349/61 |
| 2010/0315813 A1 | 12/2010 | Fugerer et al. | |
| 2011/0085328 A1* | 4/2011 | Boyer ...................... | F21V 7/04 362/235 |

(Continued)

FOREIGN PATENT DOCUMENTS

| | | |
|---|---|---|
| CN | 101520158 A | 9/2009 |
| CN | 101 684 914 A | 3/2010 |

(Continued)

OTHER PUBLICATIONS

Extended Search Report in European Application No. 15164048.9 dated Jun. 15, 2016. 6 pages.

(Continued)

Primary Examiner — Elmito Breval
Assistant Examiner — Jessica M Apenteng
(74) Attorney, Agent, or Firm — Womble Bond Dickinson (US) LLP

(57) ABSTRACT

A light bar for use as a light source of a backlight module in a liquid crystal display, comprising a circuit board (1) and LEDs (2) arranged on the circuit board (1), wherein a light compensation unit (5) is arranged between the LEDs (2) on the circuit board (1).

20 Claims, 2 Drawing Sheets

(56) References Cited

U.S. PATENT DOCUMENTS

| | | | |
|---|---|---|---|
| 2011/0141769 A1 | 6/2011 | Lee et al. | |
| 2011/0205734 A1* | 8/2011 | Yamakita | G02F 1/133606 362/235 |
| 2012/0064134 A1* | 3/2012 | Bourke, Jr. | A61Q 17/04 424/401 |
| 2013/0258247 A1* | 10/2013 | Tang | G02B 6/0023 349/65 |
| 2014/0240979 A1* | 8/2014 | Chen | F21V 7/00 362/235 |
| 2016/0139328 A1 | 5/2016 | Hikmet et al. | |

FOREIGN PATENT DOCUMENTS

| | | |
|---|---|---|
| CN | 101684914 A | 3/2010 |
| CN | 103032765 A | 4/2013 |
| WO | WO 2009012245 A2 | 1/2009 |
| WO | WO 2014/202726 A1 | 12/2014 |
| WO | WO 2014202726 A1 | 12/2014 |

OTHER PUBLICATIONS

Office Action in European Application No. 15164048.9 dated May 19, 2017.

Office Action in Chinese Application No. 201510001845.7 dated May 31, 2017, with English translation.

Office Action in Chinese Application No. 201510001845.7 dated Nov. 3, 2017, with English translation.

"Second office action," CN Application No. 201510001845.7 (dated Nov. 3, 2017).

Office Action received for European Patent Application No. 15164048.9, dated Apr. 16, 2018, 9 pages.

Office Action received for Chinese Patent Application No. 201510001845.7, dated Apr. 13, 2018, 12 pages (7 pages of English Translation and 5 pages of Office Action).

* cited by examiner

LIGHT BAR AND DISPLAY DEVICE

RELATED APPLICATIONS

The present application claims the benefit of Chinese Patent Application No. 201510001845.7, filed Jan. 5, 2015, the entire disclosure of which is incorporated herein by reference.

FIELD

The present disclosure relates to the field of display technology, and in particular, to a light bar and a display device comprising the light bar.

BACKGROUND

Liquid Crystal Displays (LCDs) are receiving increasingly wide use for advantages such as low radiation, low power consumption as well as slim and light construction, and have become the predominant displays at present.

In a liquid crystal display, due to the fact that the liquid crystal per se does not emit light, a backlight module is necessary for cooperating therewith to provide the display light source. One of the essential components for the backlight module is a light guide plate, which is used for converting a plurality of point or linear light sources into the form of an area light source, and guiding the emitted light to a display panel. By means of micro-structure formation processes such as injection molding, hot pressing and ink jet, pre-designed mesh structures are formed on the light guide plate, which is key to implementing a backlight module with outstanding optical luminance and homogenous style. In the mesh design for the light guide plate, a key parameter is the ratio between a distance, which is between the light source (e.g. light emitting diodes (LEDs)) and an active area of the display panel, and a pitch between the plurality of light sources, i.e. an A/P ratio. When A/P is relatively small, it is difficult to mix the light between the LEDs, so that hotspot phenomenon is very easily aroused. Specifically, FIG. 1 shows typically a light source part of an LED backlight module being one LED light bar, wherein there is a certain distance between the LEDs. Since the LEDs emit light in a certain angle, as the LED light bar is illuminated after being assembled with the light guide plate, there will be areas between the LEDs where light rays cannot arrive or the arrival light rays are considerably weak, giving rise to an optical phenomenon with alternating bright and dark areas, which is called "hotspot".

As the liquid crystal displays develop towards a lighter and thinner profile, a narrower frame (reduced distance between the light source and the active area) and a lower power consumption (reduced number of light sources, increased pitch between the plurality of light sources), the A/P ratio will become smaller and smaller. When the A/P ratio is smaller than a predetermined value, even though the mesh structures on the light guide plate may be optimized, still dark areas will appear inevitably on the light guide plate thus leading to the phenomenon of hotspot. To take a display panel suitable for a notebook computer for example, it has been found that when the A/P ratio is smaller than 0.65, the light guide plate will be present with the hotspot that is non-improvable from the mesh design.

In order to solve the above problems, solutions in the prior art conventionally include: (1) attaching a black or white shielding tape at the U-turn of a back plate located below the light guide plate such that it is able to absorb or reflect intense light emitted from the light sources and shield as far as possible the light emitting areas to alleviate the hotspot; (2) forming a "V" shaped zigzag structure at an end face of the incidence side of the light guide plate by means of blade rotating machinery processing (V-cut process) so that the incident light is scattered to thereby alleviate the hotspot. Due to the introduction of a shielding tape, solution (1) of the above increases the difficulty in assembling and sacrifices the area of the light emitting regions, so that a side frame of the light bar becomes wider. Meanwhile, the black shielding tape causes loss of the emitted light from the backlight module for being absorptive to intense light. Due to the introduction of V-cut process, solution (2) of the above causes a decrease in the yield of the light guide plate and an increase in their costs, from which also debris from the light guide plate is easily resulted, and the light guide plate debris may scratch the LEDs (resulting in discoloration) and the light guide plate (resulting in bright spot).

On the other hand, the immense heat released along the light emission from LEDs greatly affects the light emission efficiency and the lifetime of the LEDs. It has been found that when temperature of the LEDs exceeds a predetermined value, the light emission efficiency and the lifetime of the LEDs will decrease in progression exponentially. According to the Arrhenius law, every 10° C. elevation of the temperature can result in a shortening by one half of the LED lifetime. Furthermore, the liquid crystal display in longtime operation can very easily cause an excessive concentration of heat surrounding the LEDs such that the LEDs and their circumferential circuitries are influenced disadvantageously.

At present, heat dispersion for LEDs depends largely on the use of an L/B laminated aluminum substrate, with which concentration of heat in spots (around the PN junctions of the LEDs) is split into a bar-like form of concentration to increase the areas of heat distribution and to implement heat dispersion by means of air convection. By doing so, although the over-heating can be alleviated, the air with an extremely low heat transfer coefficient may not transfer the heat efficiently. With respect to the LEDs in longtime operation, heat accumulation still persists since the heat generation rate is greater than the heat transfer rate.

CN 200810222740.4 describes a backlight lamp assembly, which comprises a circuit board and LEDs arranged on the circuit board; wherein, at a side of the circuit board arranged with the LEDs a thermoluminescent material layer is provided, and the thermoluminescent material layer is provided thereon with through-holes that correspond to the LEDs, said LEDs penetrating said through-holes.

SUMMARY

It is an object of the present disclosure to provide a light bar for use as a light source in a backlight module for a liquid crystal display, a backlight module comprising the light bar and a display device comprising the backlight module, which preferably eliminate or at least alleviate one or more of the above-mentioned various drawbacks in the prior art.

In a first aspect of the present disclosure, a light bar is provided, which may comprise a circuit board and LEDs arranged on the circuit board, wherein a light compensation unit is arranged between the LEDs on the circuit board. An advantage of the light bar is that instead of providing a light compensation unit on the whole circuit board resulting in the improvement of luminances both at the bright and the dark areas, the shapes of light compensation units between the LEDs can be designed in accordance with the desired backlight image, whereby the hotspot with alternating brightness and darkness is solved by local compensation.

According to an embodiment of the present disclosure, the light compensation unit may comprise a thermoluminescent material and color complementary quantum dots corresponding to the thermoluminescent material. The thermoluminescent material and the color complementary quantum dots convert the heat generated from the LEDs to an light output, and such reasonable utilization of the heat not only avoids heat accumulation and remains the heat surrounding the LEDs in a reliable range, but also facilitates advances in the quality and the lifetime of the display panel relatively to the implementation involving heat conduction only without heat consumption. Furthermore, in general, the chromaticity of the light emitted by the thermoluminescent material alone is not desirable. By mixing the thermoluminescent material with a new material that so-called nano-sized quantum dots, not only the monochromatic thermoluminescent material (e.g. blue/purple) can be utilized, but an adaptability of the white-light chromaticity is also realized by mixture in different proportions of the thermoluminescent material and the quantum dots, so as to generate high quality white light compatible with the LEDs, and thus improve the quality of images at the light compensation areas.

According to an embodiment of the present disclosure, the thermoluminescent material and the color complementary quantum dots have a mass ratio between 1:1 and 3:1. This is because a light emission efficiency ratio of the thermoluminescent material and the color complementary quantum dots is generally between 1:1 and 1:3.

According to an embodiment of the present disclosure, the thermoluminescent material may comprise a $Bi^{3+}$ activated alkaline earth sulfide, and the color complementary quantum dots may comprise CdSe with a particle size of 20-24 nm. Specifically, the $Bi^{3+}$ activated alkaline earth sulfide material emits a blue light under heat, while the CdSe with a particle size of 20-24 nm emits a yellow light under excitation, and hence, these are mixed to form white light.

According to another embodiment of the present disclosure, the thermoluminescent material may comprise a first thermoluminescent material and a second thermoluminescent material. In particular, the first thermoluminescent material may comprise a $Bi^{3+}$ activated alkaline earth sulfide, the second thermoluminescent material may comprise a $Ce^{3+}$ activated alkaline earth sulfide, and the color complementary quantum dots may comprise CdSe/ZnS quantum dots with a particle size of 5.0-5.5 nm; or alternatively, the first thermoluminescent material may comprise a $Bi^{3+}$ activated alkaline earth sulfide, the second thermoluminescent material may comprise an $Eu^{3+}$ activated alkaline earth sulfide, and the color complementary quantum dots may comprise CdSe/ZnS quantum dots with a particle size of 3.0-3.5 nm, wherein the $Bi^{3+}$ activated alkaline earth sulfide material emits a blue light under heat, the $Ce^{3+}$ activated alkaline earth sulfide material emits a green light under heat, the CdSe/ZnS with a particle size of 5.0-5.5 nm emits a red light under excitation, the $Eu^{3+}$ activated alkaline earth sulfide material emits a red light under heat, and the CdSe/ZnS quantum dots with a particle size of 3.0-3.5 nm emit a green light under excitation; and hence, both combinations above form white light.

According to a further embodiment of the present disclosure, the color complementary quantum dots may comprise first quantum dots and second quantum dots. In particular, the thermoluminescent material may comprise a $Bi^{3+}$ activated alkaline earth sulfide, the first quantum dots may comprise CdSe/ZnS quantum dots with a particle size of 5.0-5.5 nm, and the second quantum dots may comprise CdSe/ZnS quantum dots with a particle size of 3.0-3.5 nm, wherein the $Bi^{3+}$ activated alkaline earth sulfide emits a blue light under heat, the CdSe/ZnS with a particle size of 5.0-5.5 nm emits a red light under excitation, and the CdSe/ZnS quantum dots with a particle size of 3.0-3.5 nm emit a green light under excitation; and hence, these are mixed to form white light.

It can be seen that the cooperation from the color complementary quantum dots promotes an applicability and practicability of the thermoluminescent material, enabling an easier generation of high-quality white light and a controllable quality of the white light through formulation adjustment.

According to an embodiment of the present disclosure, a thermally conductive layer may be provided at the side of the circuit board arranged with the LEDs. The thermally conductive layer is provided with through-holes that correspond to the LEDs and the LEDs penetrate the through-holes. The thermally conductive layer is capable of conducting and dispersing the heat generated by the LEDs efficiently and uniformly to the light compensation units, facilitating the thermoluminescent material and the color complementary quantum dots in the light compensation unit to convert the heat into white light, and contributing to hotspot alleviation in the backlight module.

According to another embodiment of the present disclosure, the LEDs may comprise a long border and a short border, and the thermally conductive layer may have a zigzag structure at the long border of the LEDs. This zigzag structure can increase the heat conduction area of the thermally conductive layer and improve the heat conduction efficiency. The absence of zigzag structure at the short border of the LEDs is for the purpose of providing sufficient space for the light compensation units between LEDs.

According to a further embodiment of the present disclosure, the thermally conductive layer may include a thermoplastic material at a side close to the circuit board and a high-thermally conductive material at a side facing away from the circuit board. The thermoplastic material is for instance polyethylene terephthalate (PET), polymethyl methacrylate (PMMA), polystyrene (PS), polycarbonate (PC), etc. In particular, the high-thermally conductive material is graphene. The graphene is a known extremely thin material (possibly below 0.1 mm by means of chemical vapor deposition) with extremely high efficiency in heat conduction (with a thermal conductivity up to 5300 W/m·K), which can quickly disperse the heat released during operation of the LEDs over the entire thermally conductive layer.

According to a yet further embodiment of the present disclosure, a total thickness of the light compensation unit and the thermally conductive layer may be less than 0.6 mm and a thickness of the thermally conductive layer may be less than 0.3 mm, thus avoiding the influence on optical effects due to the cause that the total thickness of the light compensation unit and the thermally conductive layer is beyond the height of a typical LED.

According to further aspects of the present disclosure, a backlight module comprising a light bar of any embodiment described above and a display device comprising the backlight module are provided. Such backlight module and display device have the same beneficial effects as the above-said light bar, which will not be here repeated.

BRIEF DESCRIPTION OF THE DRAWINGS

The other objects and features of the present disclosure will become apparent from the detailed description as follows in conjunction with the accompanying drawings. However, it is to be understood that the drawings are shown for illustrative purpose only, rather than restrictive, and the drawings are not necessarily drawn to scale, wherein.

Like reference numerals are used to refer to like elements throughout, which are specifically: 1 circuit board; 2 LED; 3 thermally conductive layer; 4 zigzag structure; 5 light compensation unit.

DETAILED DESCRIPTION

Figure 1:
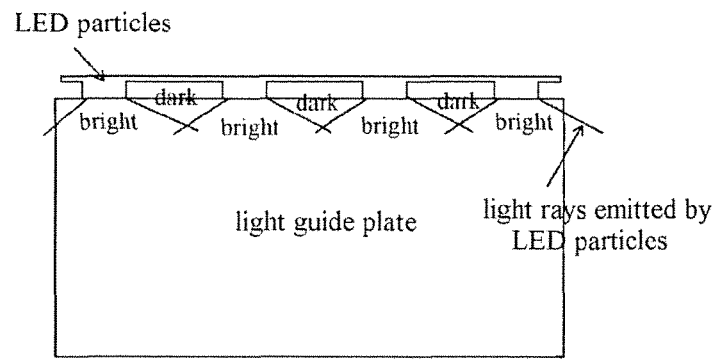
FIG. 1 schematically illustrates hotspot occurred on a guide light plate.
Figure 2:
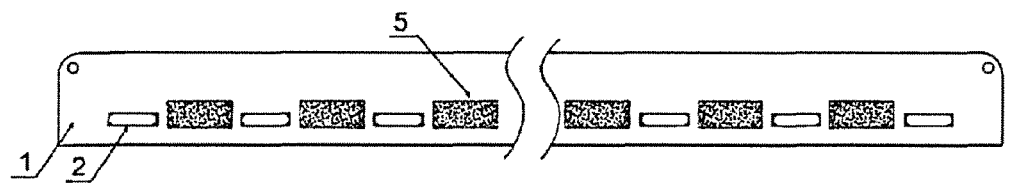
FIG. 2 is a schematic top view of a light bar according to an embodiment of the present disclosure.

FIG. 2 shows a schematic top view of a light bar according to an embodiment of the present disclosure. As shown in FIG. 2, the light bar comprises a circuit board 1 and a plurality of LEDs 2 arranged on the circuit board 1, and a light compensation unit 5 is arranged between the LEDs 2 on the circuit board 1. The circuit board 1 may be a flexible circuit board, and a shape of the light compensation unit 5 arranged between the LEDs 2 may be designed in accordance with the desired backlight image and is not only limited to the rectangular shape as shown in the drawing. The light compensation unit 5 improves, via local compensation, the luminances at areas between the LEDs 2 where light rays cannot arrive or the arrival light rays are considerably weak, thereby making improvement to the situation of hotspot with alternating brightness and darkness.

The light compensation unit 5 may comprise a thermoluminescent material and corresponding color complementary quantum dots thereof. Such light compensation unit 5 may be manufactured through the following steps: mixing the thermoluminescent material and the corresponding color complementary quantum dots in proportions into an ultraviolet curing adhesive (UV adhesive), and performing UV-curing for the mixture. Note that for different types of displays, the proportions of the thermoluminescent material and the corresponding color complementary quantum dots in the light compensation unit 5 are varied due to different light bar designs in the backlight module and different optical requirements. In general, best light mixing effect is achieved when the thermoluminescent material and the corresponding color complementary quantum dots are in a mass ratio between 1:1 and 3:1, since a light emission efficiency ratio between the thermoluminescent material and the color complementary quantum dots is usually between 1:1 and 1:3. To take a light compensation unit comprising $Ba^{3+}$ activated MgS as the thermoluminescent material and CdSe as the color complementary quantum dots for example, the color of the mixed light is most approximate to the white light emitted by LED when the mass ratio of $Ba^{3+}$ activated MgS and the CdSe is equal to 1.85:1, and best light compensation effect is thus achieved.

The mixed white light can be acquired through three schemes as follows:

(1) bi-chromatic complementation: a thermoluminescent material+color complementary quantum dots, e.g. a $Bi^{3+}$ activated alkaline earth sulfide material (blue)+CdSe with a particle size of 20-24 nm (excited yellow);

(2) tri-chromatic complementation scheme 1: a first thermoluminescent material+a second thermoluminescent material+quantum dots, e.g. a $Bi^{3+}$ activated alkaline earth sulfide material (blue)+a $Ce^{3+}$ activated alkaline earth sulfide material (green)+CdSe/ZnS quantum dots with a particle size of 5.0-5.5 nm (excited red), or a $Bi^{3+}$ activated alkaline earth sulfide material (blue)+an $Eu^{3+}$ activated alkaline earth sulfide material (red)+CdSe/ZnS quantum dots with a particle size of 3.0-3.5 nm (excited green);

(3) tri-chromatic complementation scheme 2: a thermoluminescent material+first quantum dots+second quantum dots, e.g. a $Bi^{3+}$ activated alkaline earth sulfide material (blue)+CdSe/ZnS quantum dots with a particle size of 5.0-5.5 nm (excited red)+CdSe/ZnS quantum dots with a particle size of 3.0-3.5 nm (excited green).

The cooperation from the color complementary quantum dots promotes an applicability and practicability of the thermoluminescent material, enabling an easier generation of high quality white light and a controllable quality of the white light through formulation adjustment. Furthermore, the quantum dots are comprehensive in type, provide good optical stability, have high luminous color purity/quantum efficiency, and are strongly controllable in luminescence. The light compensation unit 5 comprising a thermoluminescent material and corresponding color complementary quantum dots thereof can thus lead to controllable and stable high-quality white light relative to a solution using a thermoluminescent material only, and therewith, better hotspot compensation effects are achieved.

Figure 3:
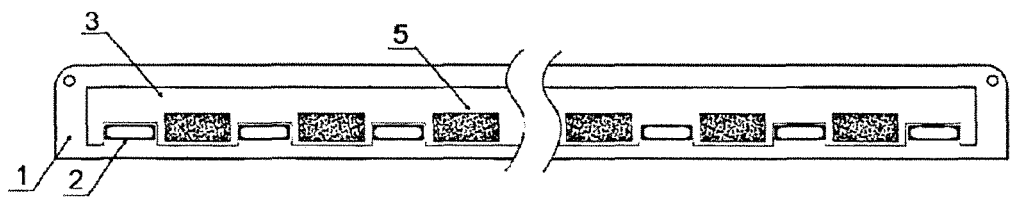
FIG. 3 is a schematic top view of a light bar according to another embodiment of the present disclosure.

FIG. 3 shows a schematic top view of a light bar according to another embodiment of the present disclosure. As shown in FIG. 3, at a side of the circuit board 1 arranged with the LEDs 2 a thermally conductive layer 3 is provided. The thermally conductive layer 3 is provided with through-holes that correspond to the plurality of LEDs 2, and the LEDs 2 penetrate the corresponding through-holes. As an example, the thermally conductive layer 3 may be a thermally conductive glue adhered to the circuit board 1. The UV-cured light compensation unit 5 may be compression molded on the thermally conductive layer 3 with high pressure. The thermally conductive layer 3 is capable of conducting and dispersing the heat generated by the LEDs 2 efficiently and uniformly to the light compensation unit 5, facilitating the thermoluminescent material and the color complementary quantum dots in the light compensation unit 5 to convert the heat into white light, and contributing to hotspot alleviation in the backlight module.

The thermally conductive layer 3 may comprise a thermoplastic material 31 at a side close to the circuit board and a high-thermally conductive material 32 at a side facing away from the circuit board. The thermoplastic material 31 provides a plastic substrate for the high-thermally conductive material 32 and facilitates a uniform and stable distribution of the high-thermally conductive material 32. The thermoplastic material 31 is for instance polyethylene terephthalate (PET), polymethyl methacrylate (PMMA), polystyrene (PS), polycarbonate (PC), etc. The high-thermally conductive material 32 may be deposited on the thermoplastic material 31 by chemical vapor deposition or may be coated on the thermoplastic material 31 by coating techniques, and may for example be graphene. The high-thermally conductive material 32 can quickly disperse the heat released during operation of the LEDs 2 over the entire thermally conductive layer 3.

Figure 4:
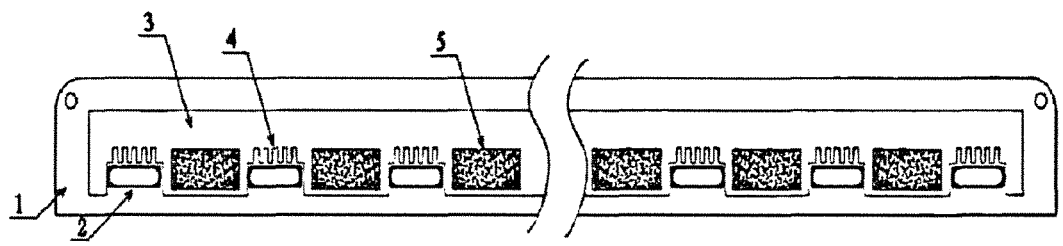
FIG. 4 is a schematic top view of a light bar having a zigzag structure according to an embodiment of the present disclosure.

FIG. 4 shows a schematic top view of a light bar having a zigzag structure 4 according to an embodiment of the present disclosure. As shown in FIG. 4, the LEDs 2 comprise a long border and a short border, and the thermally conductive layer 3 has a zigzag structure 4 at the long border of the LEDs 2. This zigzag structure 4 can increase the heat conduction area of the thermally conductive layer 3 and improve the heat conduction efficiency. In order to provide sufficient space for the light compensation units 5 between the LEDs 2, the zigzag structure 4 is not arranged at the short border of the LEDs 2. Note that the thermally conductive layer 3 may also have other shapes at the long border of the LEDs 2 in order to increase the heat conduction area without being limited to a zigzag shape.

Figure 5:
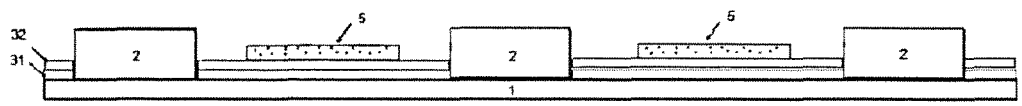
FIG. 5 is a schematic sectional view of a light bar according to an embodiment of the present disclosure.

FIG. 5 shows a schematic sectional view of a light bar according to an embodiment of the present disclosure. As shown in FIG. 5, the circuit board 1 is provided thereon with a thermally conductive layer 3 including a thermoplastic material 31 and a high-thermally conductive material 32; a plurality of through-holes are provided correspondingly to the LEDs 2 in the thermally conductive layer 3, and the LEDs 2 penetrate the corresponding through-holes; a light compensation unit 5 is located on the high-thermally conductive material 32 and between the LEDs 2. Note that the dimensions of each layer in FIG. 5 are not representative of the real scale, and the light compensation unit 5 may have any shape that is not limited to the rectangular shape. Influence may be resulted on optical effects if a total thickness of the light compensation unit 5 and the thermally conductive layer 3 goes beyond a height of the LED 2, and accordingly, the total thickness of the light compensation unit 5 and the thermally conductive layer 3 should be less than the height of the LED 2 (e.g. a currently predominant 3806LED has a thickness of 0.6 mm), and the thickness of the thermally conductive layer 3 may be less than 0.3 mm.

Figure 6:
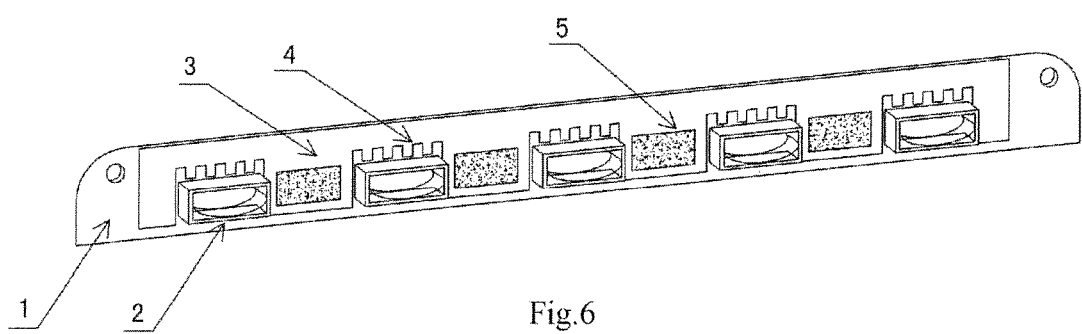
FIG. 6 is a 3D view of a light bar according to an embodiment of the present disclosure.

FIG. 6 shows a 3D view of a light bar according to an embodiment of the present disclosure, in which the light compensation unit 5 is shown in a rectangular shape by example. The operation principle of the light compensation unit 5 is illustrated through FIG. 6. While the light bar is in operation, the LEDs 2 emit light and release a large amount of heat. The thermally conductive layer 3 quickly collects the immense heat released during light emission of the LEDs 2 via the zigzag structure 4, and the high-thermally conductive material 32 therein quickly transfers the heat to the entirety of the thermally conductive layer 3. Subsequently, the thermoluminescent material within the light compensation unit 5 on the thermally conductive layer 3 releases light under heat, while the light released therefrom in turn excites the color complementary quantum dots mixed therewith to emit light of a complementary color, whereupon the two types of light are mixed to form white light so as to compensate for the dark areas formed with images corresponding to the areas between the LEDs 2 due to incapability of LED emitted rays to arrive at those areas without the light compensation unit 5. Consequently, the hotspot presence with alternating brightness and darkness is eased.

While the disclosure has been illustrated and described in detail in the drawings and forgoing description, such illustration and description are to be considered illustrative or exemplary and not restrictive; the disclosure is not limited to the disclosed embodiments.

Other variations to the disclosed embodiments can be understood and effected by those skilled in the art in practicing the claimed invention, from a study of the drawings, the disclosure, and the appended claims. In the claims, the word "comprise" and its variations do not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A light bar comprising a circuit board, LEDs in first regions on the circuit board, and a light compensation unit in each of second regions on the circuit board, wherein along a direction of a long side of the circuit board, the first regions and the second regions are arranged alternatively, and each light compensation unit is configured to convert heat produced by adjacent LEDs in the first regions to light output to make the first regions and the second regions have a substantially equal luminance.

2. The light bar according to claim 1, wherein the light compensation unit (5) comprises a thermoluminescent material and color complementary quantum dots corresponding to the thermoluminescent material, the thermoluminescent material and color complementary quantum dots used for converting heat generated from the LEDs to a light output.

3. The light bar according to claim 2, wherein the thermoluminescent material and the color complementary quantum dots have a mass ratio between 1:1 and 3:1.

4. The light bar according to claim 3, wherein the thermoluminescent material comprises a $Bi^{3+}$ activated alkaline earth sulfide, and the color complementary quantum dots comprise CdSe with a particle size of 20-24 nm.

5. The light bar according to claim 3, wherein the thermoluminescent material comprises a first thermoluminescent material and a second thermoluminescent material.

6. The light bar according to claim 3, wherein the color complementary quantum dots comprise first quantum dots and second quantum dots.

7. The light bar according to claim 2, wherein the thermoluminescent material comprises a $Bi^{3+}$ activated alkaline earth sulfide, and the color complementary quantum dots comprise CdSe with a particle size of 20-24 nm.

8. The light bar according to claim 2, wherein the thermoluminescent material comprises a first thermoluminescent material and a second thermoluminescent material.

9. The light bar according to claim 8, wherein the first thermoluminescent material comprises a $Bi^{3+}$ activated alkaline earth sulfide, the second thermoluminescent material comprises a $Ce^{3+}$ activated alkaline earth sulfide, and the color complementary quantum dots comprise CdSe/ZnS quantum dots with a particle size of 5.0-5.5 nm.

10. The light bar according to claim 8, wherein the first thermoluminescent material comprises a $Bi^{3+}$ activated alkaline earth sulfide, the second thermoluminescent material comprises an $Eu^{3+}$ activated alkaline earth sulfide, and the color complementary quantum dots comprise CdSe/ZnS quantum dots with a particle size of 3.0-3.5 nm.

11. The light bar according to claim 2, wherein the color complementary quantum dots comprise first quantum dots and second quantum dots.

12. The light bar according to claim 11, wherein the thermoluminescent material comprises a $Bi^{3+}$ activated alkaline earth sulfide, the first quantum dots comprise CdSe/ZnS quantum dots with a particle size of 5.0-5.5 nm, and the second quantum dots comprise CdSe/ZnS quantum dots with a particle size of 3.0-3.5 nm.

13. The light bar according to claim 1, wherein at a side of the circuit board (1) arranged with the LEDs (2) a thermally conductive layer (3) is provided, and the thermally conductive layer (3) is provided with through-holes that correspond to the LEDs (2), the LEDs (2) penetrating said through-holes.

14. The light bar according to claim 13, wherein the LEDs (2) comprise a long border and a short border, and the thermally conductive layer (3) has a zigzag structure (4) at the long border of the LEDs (2).

15. The light bar according to claim 14, wherein the thermally conductive layer (3) comprises a thermoplastic material (31) at a side close to the circuit board (1) and a high-thermally conductive material (32) at a side facing away from the circuit board (1).

16. The light bar according to claim 13, wherein the thermally conductive layer (3) comprises a thermoplastic material (31) at a side close to the circuit board (1) and a high-thermally conductive material (32) at a side facing away from the circuit board (1).

17. The light bar according to claim 16, wherein the high-thermally conductive material (32) is graphene.

18. The light bar according to claim 13, wherein a total thickness of the light compensation unit (5) and the thermally conductive layer (3) is less than 0.6 mm and a thickness of the thermally conductive layer (3) is less than 0.3 mm.

19. A backlight module comprising a light bar according to claim 1.

20. A display device comprising a backlight module according to claim 19.

* * * * *